No. 704,699. Patented July 15, 1902.
D. FERGUSSON.
TRANSMISSION GEAR.
(Application filed Apr. 17, 1902.)
(No Model.)

Witnesses,
O. B. Hornbeck
C. M. Bentley

David Fergusson Inventor,
By Wilhelm & Bonner
Attorneys.

UNITED STATES PATENT OFFICE.

DAVID FERGUSSON, OF BUFFALO, NEW YORK, ASSIGNOR TO THE GEORGE N. PIERCE COMPANY, OF BUFFALO, NEW YORK.

TRANSMISSION-GEAR.

SPECIFICATION forming part of Letters Patent No. 704,699, dated July 15, 1902.

Application filed April 17, 1902. Serial No. 103,291. (No model.)

*To all whom it may concern:*

Be it known that I, DAVID FERGUSSON, a subject of the King of Great Britain, and a resident of Buffalo, in the county of Erie and State of New York, have invented a new and useful Improvement in Transmission-Gears, of which the following is a specification.

This invention relates to a variable-speed and reversing gear for transmitting power from a shaft in one direction at different speeds or in a reverse direction without changing the speed or direction of rotation of the shaft.

The object of the invention is to provide a simple, strong, and noiseless transmission-gear which is composed of few parts and in which the wear is reduced to a minimum.

Figure 1:
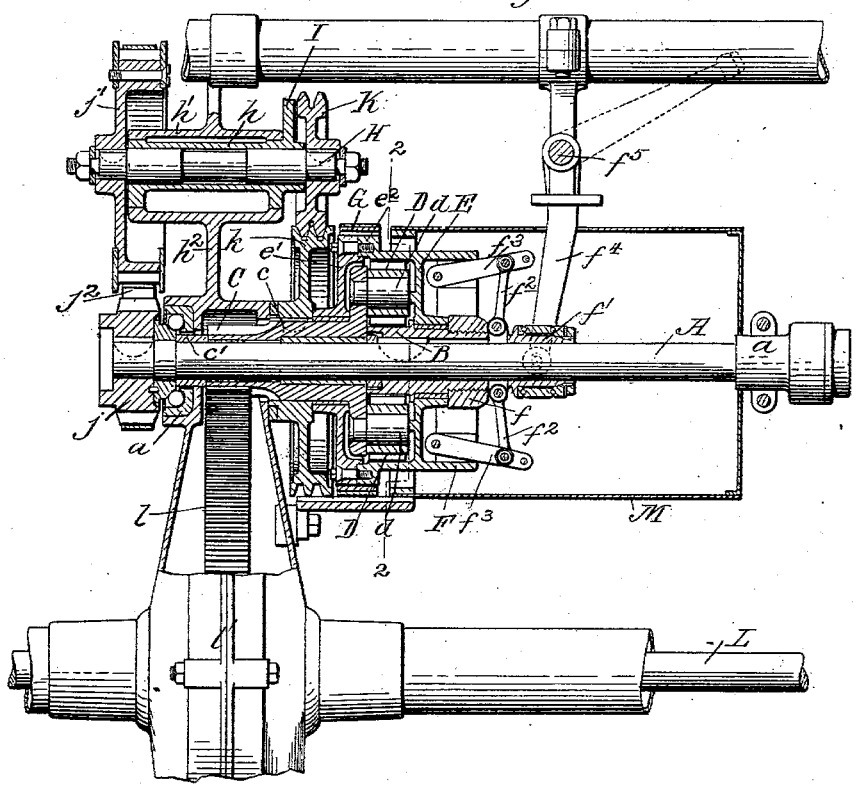
Figure 2:
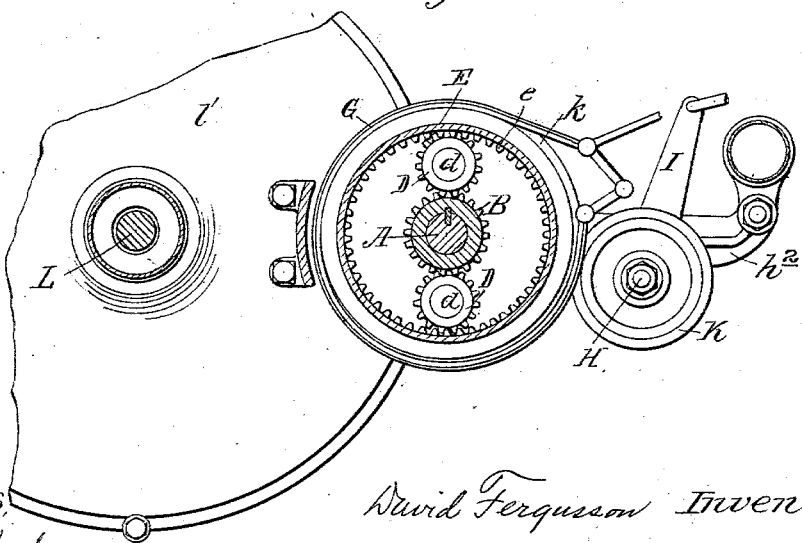

In the accompanying drawings, Figure 1 is a longitudinal sectional elevation of a transmission-gear embodying the invention. Fig. 2 is a transverse section through the slow-speed gear on line 2 2, Fig. 1.

Like letters of reference refer to like parts in both figures.

A represents a transmission-shaft, which is journaled in suitable bearings $a$ and is intended to be driven in a constant direction in any suitable manner from a motor or other source of power. B represents a driving-pinion, which is formed with or carried by a sleeve keyed to said shaft, so as to rotate therewith, and C represents a driven pinion, which is carried by or formed with a hollow shaft $c$, journaled to rotate about the axis of rotation of the transmission-shaft, preferably on suitable bushings on the transmission-shaft. The hollow shaft is held from longitudinal movement on the transmission-shaft by suitable means, such as a locking-collar between one end of the hollow shaft and the driving-pinion and a distance-collar $c'$ between the opposite end of the hollow shaft and the adjacent bearing for the transmission-shaft. The hollow shaft constitutes a carrier for one or more planet-pinions D. In the construction shown there are two planet-pinions, which are journaled on studs or pins $d$, secured to a plate or arms at the inner end of the hollow shaft and mesh with and are driven by the driving-pinion B.

E represents a wheel which is journaled to rotate about the axis of rotation of the transmission-shaft, preferably on a suitable bushing on the sleeve of the driving-pinion. The inner side of the rim of said wheel overhangs or surrounds the planet-pinions and the driving-pinion and is provided with internal gear-teeth $e$, which mesh with the planet-pinions.

$e'$ represents a cover plate or disk which is loosely journaled on a bushing on the inner end of the hollow shaft and is secured at its outer edge to an outwardly-extending flange $e^2$ on the adjacent edge of the rim of the wheel E. The wheel E and the cover plate or disk $e'$ thus constitute a dust-proof casing or grease-box completely inclosing the planet and driving pinions and adapted to hold grease or oil for the pinions to run in. The wheel E or grease-casing is held from longitudinal movement in one direction by the engagement of the cover-plate with the plate which carries the planet-pinions and from opposite movement by a collar on the driving-pinion sleeve inside of the wheel-hub, and the engagement of the wheel-hub with this collar prevents longitudinal movement of the driving-pinion in one direction, while it is held from opposite movement by the hollow shaft.

If the wheel E is locked to the transmission-shaft, so as to rotate therewith, the planet-pinions being held from rotation between the driving-pinion and the internal gear-teeth of the wheel will be locked to the shaft and will move with the latter, carrying the hollow shaft and driven pinion with the transmission-shaft and at the same speed. If the wheel E is held from rotation, the planet-pinions will be rotated on their studs by the driving-pinion and will roll around the internal gear, thus rotating the hollow shaft and driven pinion in the same direction as the transmission-shaft and at a slow speed, determined by the relative sizes of the driving and planet pinions. Any suitable or ordinary means may be employed for locking the wheel E to the transmission-shaft or holding it stationary. In the construction shown the outwardly-extending part F of the wheel-rim constitutes one member of an ordinary friction-clutch, the other member $f$ of which is fixed to the outer end of the sleeve of the driving-pinion.

$f'$ represents the clutch-operating collar, which is loosely mounted on the transmission-shaft and is operatively connected to the clutch by the usual links $f^2$ and levers $f^3$. The collar is moved longitudinally on the shaft to operate the clutch by any suitable means, such as an arm $f^4$, which is connected to a rock-shaft $f^5$ and to the slide-collar. When the collar is moved in one direction, the wheel is clutched to the shaft, and when moved in the other direction the wheel is released, so as to permit the independent rotation of the shaft. The circumferential faces of the flange $e^2$ on the wheel and the cover disk or plate constitute a brake-surface which is surrounded by a band-brake G of ordinary construction and which may be operated by any well-known instrumentalities. When the brake is tightened about the brake-surface, the wheel E is held stationary.

The reversing-gearing is preferably constructed as follows:

H represents a reversing counter-shaft which is journaled parallel with the transmission-shaft eccentrically in a circular bushing $h$, which is mounted to turn about its axis in a fixed bearing $h'$ on a bearing-bracket $h^2$ or any suitable stationary part.

I represents a lever or arm which is fixed to the eccentric bushing and is adapted when moved to rock or turn the bushing in its bearing, and thus move the reversing counter-shaft toward or from the transmission-shaft. The reversing counter-shaft is driven from the transmission-shaft by suitable means—for instance, a sprocket-wheel $j$, fixed to the end of the transmission-shaft and connected to a sprocket-wheel $j'$, fixed on the adjacent end of the reversing-shaft, by a sprocket-chain $j^2$.

K represents a friction-wheel, which is fixed to the inner end of the reversing counter-shaft, and $k$ represents a coöperating friction-wheel, which is keyed or fixed to the hollow shaft carrying the driven pinion between the hub of the cover-disk $e'$ and the bearing for the transmission-shaft. The reversing counter-shaft is driven in the same direction as the transmission-shaft through the sprocket wheels and chain, and when the friction-wheel K is moved into frictional contact with the friction-wheel $k$ by rocking the eccentric bushing for the reversing-shaft causes the hollow shaft and driven pinion to rotate in a direction opposite to that of the transmission-shaft and at a speed determined by the relative sizes of the driving-sprockets for the reversing-shaft and the friction-wheels. When the reversing-drive is brought into action, the planet-pinions roll idly around on the driving-pinion.

The described gearing is especially desirable in connection with high-speed motors, as it obviates the necessity of small reducing gear-wheels driven at a high rate of speed, which consequently are subject to great wear and soon become worn and noisy in operation. The friction-wheels being arranged as described are not confined and can be made strong and large enough to insure the necessary frictional contact. They are practically noiseless in operation and can be proportioned to give the desired ratio of speed.

The transmission-gear herein described is designed more particularly for transmitting power from the motor to the driving-axle of a motor-vehicle and is shown in the drawings in such relation.

L represents the driving-axle of a motor-vehicle. The axle is driven from the driven pinion C by suitable means, such as a gear-wheel $l$, which meshes with the driven pinion and may be secured directly to the axle or drive it indirectly through the medium of compensating gearing located in the protecting-casing $l'$ surrounding the gear-wheel $l$. As shown, this casing $l'$ is supported by the driving-axle L and the bracket $h^2$ for the bearing for the reversing counter-shaft.

M represents a casing which surrounds the clutch and operating connections for protecting the same from dirt and dust.

I claim as my invention—

1. The combination of a transmission device adapted to be rotated at a constant speed in one direction, a driven element, gearing between said transmission device and driven element and operated by the former for rotating said driven element in one direction at different speeds, a counter-shaft movable toward and from said transmission device and driven by the latter, and gearing between said counter-shaft and said driven element for rotating the latter in the opposite direction, substantially as set forth.

2. The combination of a transmission device adapted to be rotated at a constant speed in one direction, a driven element, gearing between said transmission device and driven element and operated by the former for causing said driven element to rotate in the same direction as said transmission device and at different speeds, a counter-shaft movable toward and from said transmission device and driven by the latter, and gearing between said counter-shaft and said driven element for rotating the latter in a direction opposite to the direction of rotation of said transmission device, substantially as set forth.

3. The combination of a transmission-shaft, a driven element, means operated by said shaft for causing the rotation of said driven element in one direction at different speeds, a counter-shaft movable toward and from said transmission-shaft and driven by the latter, and friction-gearing between said counter-shaft and said driven element for rotating the latter in the opposite direction, substantially as set forth.

4. The combination of a transmission-shaft, a driven pinion rotatable about the axis of said shaft, means for locking said pinion to said shaft and for rotating said pinion independently of said shaft, a counter-shaft, a bearing for said counter-shaft mounted eccentrically to the axis of said counter-shaft and adapted to be moved to move said counter-shaft toward and from said transmission-shaft, means for driving said counter-shaft from said transmission-shaft, and means for transmitting motion from said counter-shaft to said driven pinion, substantially as set forth.

5. The combination of a transmission-shaft, a driven pinion journaled to rotate about the axis of said shaft, means for locking said pinion to said shaft, means for driving said pinion independently of said shaft, a counter-shaft, a bearing for said counter-shaft arranged eccentrically to the axis thereof and adapted to be moved to move said counter-shaft toward and from said transmission-shaft, a sprocket-wheel fixed to said transmission-shaft, a sprocket-wheel fixed to said counter-shaft, a chain connecting said sprocket-wheels, a friction-wheel secured to said counter-shaft, and a friction-wheel fixed to said driven pinion and adapted to be engaged by said friction-wheel secured to said counter-shaft, substantially as set forth.

6. The combination of a transmission-shaft, a hollow shaft rotatable about the axis of said transmission-shaft, means operated by said transmission-shaft for rotating said hollow shaft at different speeds, a counter-shaft driven by said transmission-shaft, a gear-wheel carried by said hollow shaft, a gear-wheel connected to said counter-shaft, and means for moving one of said gear-wheels into operative relation with the other, substantially as set forth.

7. The combination of a transmission-shaft, a driving-pinion fixed on said shaft, a driven pinion journaled to rotate about the axis of said transmission-shaft, an internal gear surrounding said driving-pinion, planet-pinions journaled on a part fixed to said driven pinion and meshing with said driving-pinion and with said internal gear, means for locking said internal gear to said transmission-shaft, means for holding said internal gear from rotation, a reversing-shaft journaled parallel to said transmission-shaft and driven by the latter, means for moving the same toward and from the transmission-shaft, a friction-wheel secured to said driven pinion, and a friction-wheel secured to said reversing-shaft and adapted to be moved into frictional contact with said friction-wheel secured to said driven pinion, substantially as set forth.

Witness my hand this 12th day of April, 1902.

DAVID FERGUSSON.

Witnesses:
CHAS. W. PARKER,
JNO. J. BONNER.